(12) United States Patent
Ketcham et al.

(10) Patent No.: US 6,312,020 B1
(45) Date of Patent: Nov. 6, 2001

(54) CONNECTOR FOR CONNECTING A HOSE TO A FLUID PATH WITHIN A BORE

(75) Inventors: Mark G. Ketcham, East China; Delbert L. Adkins, Clinton Township, both of MI (US)

(73) Assignee: TI Group Automotive Systems Corp, Warren, MI (US)

( * ) Notice: Subject to any disclaimer, the term of this patent is extended or adjusted under 35 U.S.C. 154(b) by 0 days.

(21) Appl. No.: 09/558,994

(22) Filed: Apr. 27, 2000

Related U.S. Application Data

(63) Continuation of application No. 09/371,367, filed on Aug. 10, 1999.

(51) Int. Cl.[7] .............................. F16L 27/00; F16L 41/00
(52) U.S. Cl. .................. 285/142.1; 285/205; 285/206; 285/256; 285/319; 285/331; 285/137.1; 411/508
(58) Field of Search ............................... 285/142.1, 256, 285/205, 206, 331, 137.1, 143.1, 319; 411/508

(56) References Cited

U.S. PATENT DOCUMENTS

| | | | | |
|---|---|---|---|---|
| 2,676,037 | * | 4/1954 | Mueller | 285/148.28 |
| 3,219,366 | * | 11/1965 | Franck | 285/190 |
| 3,315,988 | * | 4/1967 | Schroter | 285/190 |
| 3,966,235 | * | 6/1976 | Lewis | 285/25 |
| 4,142,741 | * | 3/1979 | Fiala | 285/39 |
| 4,626,006 | * | 12/1986 | Noguchi et al. | 285/158 |
| 4,798,522 | * | 1/1989 | Kaga et al. | 417/363 |
| 4,836,582 | * | 6/1989 | Krause | 285/158 |
| 5,163,716 | * | 11/1992 | Bolton et al. | 285/158 |
| 5,174,612 | * | 12/1992 | Schnell | 285/49 |
| 5,228,725 | * | 7/1993 | Aoyagi et al. | 285/158 |
| 5,271,588 | * | 12/1993 | Doyle | 248/68.1 |
| 5,533,764 | * | 7/1996 | Williamson | 285/212 |
| 5,593,279 | * | 1/1997 | Hayashi | 415/213.1 |
| 5,727,304 | * | 3/1998 | Eybergen | 29/525.04 |
| 5,829,794 | * | 11/1998 | Schulz-Hausmann et al. | 285/205 |
| 5,853,201 | * | 12/1998 | Izumi et al. | 285/179 |
| 6,095,777 | * | 8/2000 | Nishihata et al. | 418/55.1 |
| 6,193,283 | * | 2/2001 | Pickett et al. | 285/137.11 |

* cited by examiner

*Primary Examiner*—B. Dayoan
*Assistant Examiner*—Carlos Lugo
(74) *Attorney, Agent, or Firm*—Jenner & Block, LLC

(57) ABSTRACT

A connector for connecting a hose to a fluid handling device having a first bore defining a fluid path and a second bore. The connector comprises a connector housing and a retaining mechanism.

The connector housing has a first bore, a second bore and a third bore. The first bore has an entrance and a terminal end. The second bore has an entrance and a terminal end. The third bore has an entrance. The terminal end of the first bore intersects the terminal end of the second bore. The entrance of the first bore communicates with the hose. The entrance of the second bore communicates with the fluid path within the first bore of the fluid handling system. The third bore of the connector housing is parallel to the second bore and the entrance of the third bore of the connector housing is located longitudinally between the entrance of the first bore and the entrance of the second bore.

The retaining mechanism retains the connector housing to the fluid handling device. The retaining mechanism has a first end and a second end. The retaining mechanism is retained to the third bore of the connector housing at the first end of the retaining mechanism and to the second bore of said fluid handling device at the second end of the retaining mechanism.

29 Claims, 6 Drawing Sheets

CONNECTOR FOR CONNECTING A HOSE TO A FLUID PATH WITHIN A BORE

This application is a continuation in part of copending application Ser. No. 09/371,367 filed on Aug. 10, 1999.

BACKGROUND OF THE INVENTION

This invention relates to a connector for fluid paths. In particular, it relates to a connector for connecting a flexible hose to a fluid path within a bore of a fluid handling device.

In a typical automotive braking system, a brake actuated master cylinder is suitably mounted on the vehicle body or chassis and from which master cylinder and a plurality of hydraulic lines are connected to distribute hydraulic pressure to the various brake actuating mechanisms. Since the vehicle wheels move vertically and rotationally relative to the vehicle chassis or body, it is necessary to connect the wheel mounted brake mechanism to the vehicle body mounted hydraulic supply lines through a conduit assembly including a flexible hose portion. The end of the flexible hose assembly is adapted to be connected to the wheel-located brake caliper.

The connector for connecting the flexible hose to the caliper has typically been a banjo end fitting assembly. FIG. 1 depicts a typical prior art banjo end fitting assembly 10, comprising a banjo fitting 12, a bolt 14 and two washers 16 and 18.

The banjo fitting 12 includes a hollow toroidal structure 20 having an axial bore 22 with front and rear openings 24 and 26 surrounded by external ring-shaped planar coaxial surfaces 28 and 30, and an internal contour defining an annular hollow region 32 into which a radial bore 34 opens. A hollow tubular sleeve 36 projects radially outward, coaxial with the opening of the bore, to form a transition between the opening 34 and a mating tube or flexible hose 38.

Connection between the banjo fitting 12 and the bore 40 of the caliper 42 is accomplished by means of a banjo bolt 14. The banjo bolt 14 includes a hollow, bored-out shank portion 44 and a hexagonal cross-shaped head 46. The shank 44 includes an externally-threaded distal end 48 and an unthreaded proximal end 50. The unthreaded proximal end 50 includes angularly-spaced radial bores 52 which communicate the shank axial bore exteriorly.

The shank 44 of the bolt 14 is inserted through the openings 24 and 26 of the banjo fitting 12 into threading engagement with the bore 40 of the caliper 42. Flat washers 16 and 18 are inserted intermediate the fitting and the underside of the head 46 and surface of the caliper 42, respectively. When the bolt 14 is threaded tightly into the bore 40, fluid is communicated through the flexible hose 38 into the hollow tubular sleeve 36, out through the opening 34, into the central hollow of the shank 44 and into the bore of the caliper 40.

While the banjo end fitting assembly is effective in connecting a flexible hose to the bore of a component, it does have several disadvantages. One disadvantage of the banjo end fitting assembly is that it has a propensity to leak between the ring-shaped planar surfaces of the banjo fitting and the adjacent washers. Such problem with leakage between ring-shaped planar surfaces of the banjo fitting and adjacent washers was discussed and addressed in U.S. Pat. No. 5,011,192 to Campo. Campo teaches a circular washer having a symmetrically deformed inner circumference. While a washer having a deformed inner circumference is less likely to leak than a washer having a flat inner circumference, the propensity to leak still remains since possible leak paths between the banjo fitting and the washers still exist.

Another disadvantage of the banjo fitting is the labor involved in installing the banjo end fitting assembly. Installation of a banjo end fitting assembly involves sliding a bolt through a first washer, a banjo fitting and a second washer. The bolt would then need to be threaded into the bore of the caliper and tightened to a narrow range of torque specification to assure a tight seal between the washers and the banjo fitting. This process is very labor intensive.

The present invention is directed to a connector which greatly reduces the propensity to leak by eliminating the leak path between the banjo fitting and the washers. The present invention also provides for a method of installation which is much less labor intensive than a banjo end fitting assembly.

SUMMARY OF THE INVENTION

This invention relates to a connector for connecting a hose to a fluid handling device having a first bore defining a fluid path and a second bore. The connector comprises a connector housing and a retaining mechanism.

The connector housing has a first bore, a second bore and a third bore. The first bore has an entrance and a terminal end. The second bore has an entrance and a terminal end. The third bore has an entrance. The terminal end of the first bore intersects the terminal end of the second bore. The entrance of the first bore communicates with the hose. The entrance of the second bore communicates with the fluid path within the first bore of the fluid handling system. The third bore of the connector housing is parallel to the second bore and the entrance of the third bore of the connector housing is located longitudinally between the entrance of the first bore and the entrance of the second bore.

The retaining mechanism retains the connector housing to the fluid handling device. The retaining mechanism has a first end and a second end. The retaining mechanism is retained to the third bore of the connector housing at the first end of the retaining mechanism and to the second bore of said fluid handling device at the second end of the retaining mechanism.

DETAILED DESCRIPTION OF THE PREFERRED EMBODIMENTS

Figure 1:
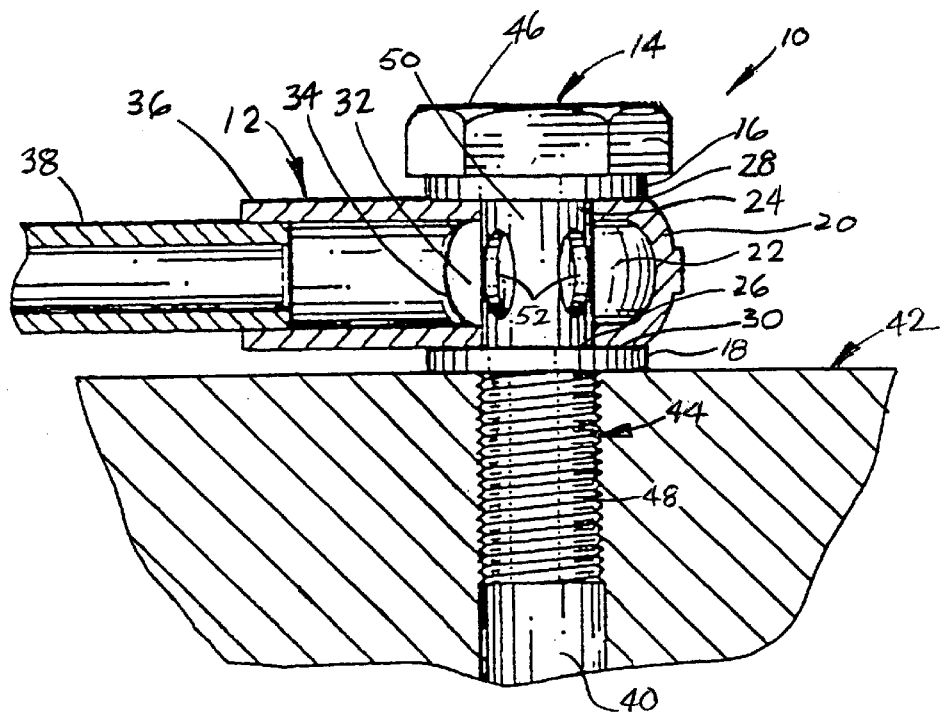
FIG. 1 is a sectional view of a typical prior art banjo end assembly as assembled in the bore of an fluid handling device.
Figure 2:
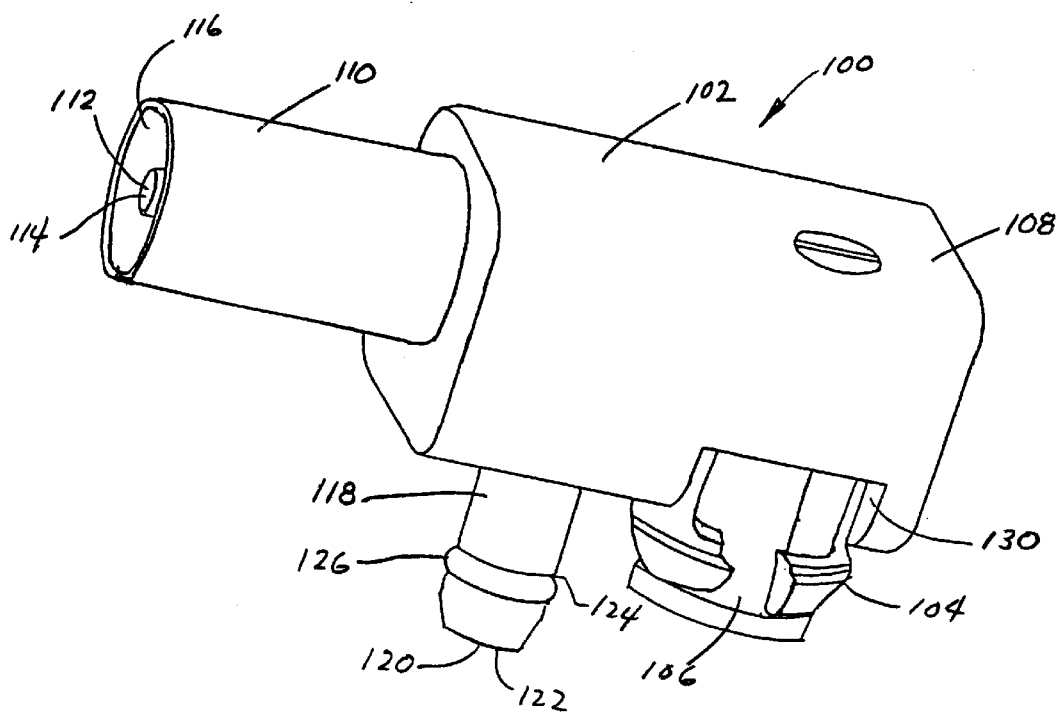
FIG. 2 is perspective view of a connector in accordance with the present invention.
Figure 3:
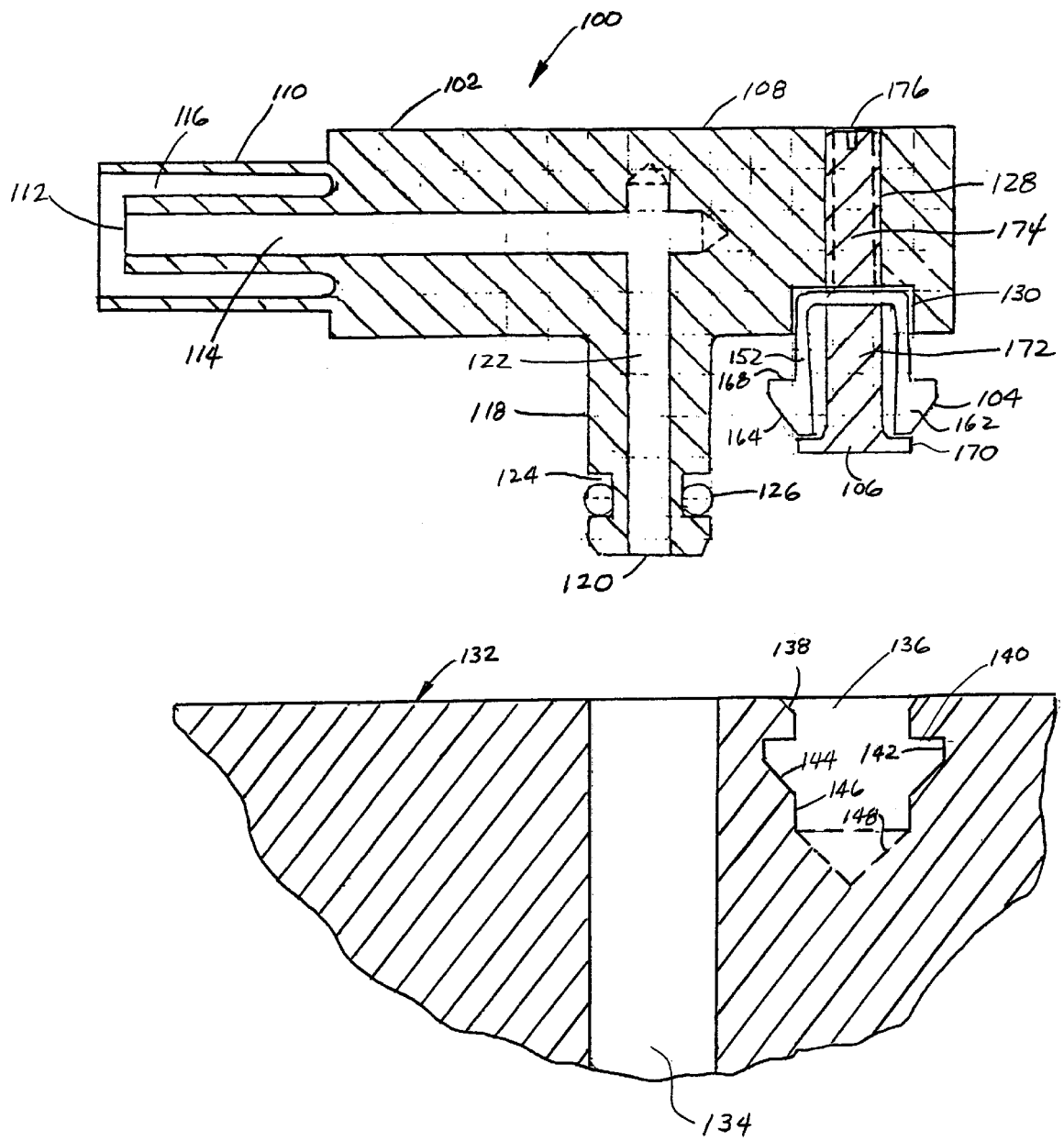
FIG. 3 is a sectional view of the connector of FIG. 2 and a fluid handling device.

A connector for connecting a flexible hose to a fluid line within a bore of a fluid handling device is illustrated in FIGS. 2 and 3. The connector 100 comprises a connector housing 102, a retainer 104 and a bolt 106.

The fluid handling device to which the connector is connected can be any kind of fluid handling device in an automobile. Such fluid handling devices include, but are not limited to, braking systems, power steering systems, transmissions, gasoline fuel systems and diesel fuel systems. For illustrative purposes only, in the preferred embodiment the fluid handling device to which the connector is connected is a caliper of a braking system. It should be noted that the application for which the connector can be applied is not limited to a caliper.

The connector housing 102 has a generally rectangular shaped body 108. Formed at one end of the connector housing is a cylindrical crimp collar 110. Located at the center of the crimp collar 110 is an entrance 112 to a first bore 114 extending axially inward into the connector housing 102 and parallel with the length of the connector housing 102. Radially outward and axially inward of the entrance 112 is an annular groove 116. The diameter of the annular groove 116 is approximately the same diameter of the flexible hose (not shown) to which the connector 100 is to be connected. Likewise, the thickness of the annular groove 116 is slightly larger than the thickness of the hose to which the connector 100 is to be connected.

A hollow protrusion 118 is formed on the underside of the connector housing 102. The protrusion 118 is perpendicular to the first bore 114. The distal end of the protrusion 118 defines an entrance 120 to a second bore 122 extending perpendicular to the first bore 114. The second bore 122 extends into the connector housing 102 until it intersects the first bore 114, thus creating a fluid path extending from the entrance 112 of the first bore 114 to the entrance 120 of the second bore 122. Therefore, the first bore 114 and the second bore 122 need only extend far enough into the connector housing 102 to intersect each other for forming the fluid line.

A channel 124 is defined on the outer surface of the protrusion 118. To provide adequate sealing between the protrusion and a bore of a caliper in which the protrusion is to be inserted, an O-ring 126 is situated in the channel 124.

A threaded third bore 128, parallel with the second bore 122, is defined in the connector housing at the other end of the connector housing from the first bore 114. Therefore, neither the first bore 114 nor the second bore 122 intersects the third bore 128. A notch 130 is located at the underside of the connector housing 102 in line with the third bore 128.

The caliper of the present invention is illustrated in FIG. 3. A first bore 134 is defined in the caliper 132 extending inwardly from the mating surface between the connector housing 102 and the caliper 132. The diameter of the first bore 134 is slightly larger than the diameter of the protrusion 118 of the connector housing 102, but is slightly smaller than the outer diameter of the O-ring 126 in its undistorted form. Therefore, upon insertion of the protrusion 118 into the first bore 134 of the caliper 132, the protrusion 118 is able to slide into the first bore 134 of the caliper 132, and the O-ring 126 is distorted between the channel 124 of the protrusion 118 and the first bore 134 of the caliper 132 to form a seal.

A second bore 136 is defined in the caliper 132 extending inwardly from the mating surface between the connector housing 102 and the caliper 132. The distance between the centerline of the first and second bore of the caliper is approximately equal to the distance between the centerline of the second and third bore of the connector housing. The second bore 136 includes a rim 138 and a radially extending annular abutment surface 140. A first cylindrical surface 142 extends axially inward from the abutment surface 140 for a short distance, and a first conical surface 144 extends axially and radially inward from the first cylindrical surface 142 to a second cylindrical surface 146. The second cylindrical surface 146 extends inwardly and terminates at a second conical surface 148.

The retainer 104 is situated in the notch 130 located at the underside of the connector housing 102. The bolt 106 is inserted through the retainer 104 and secured in the third bore 128.

Figure 4:
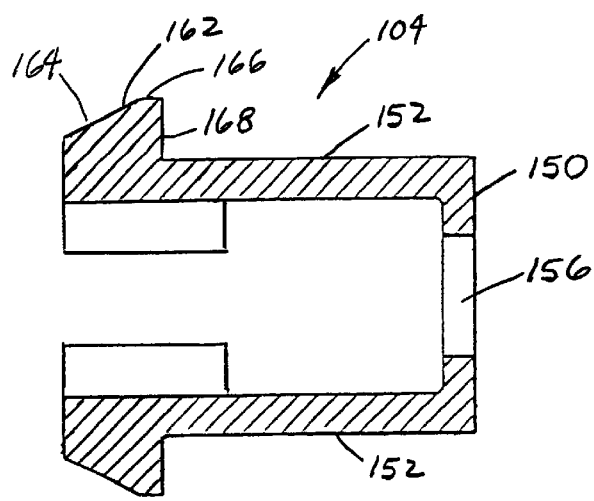
FIG. 4 is a sectional view of a retainer which is a part of the connector of FIG. 2.
Figure 5:
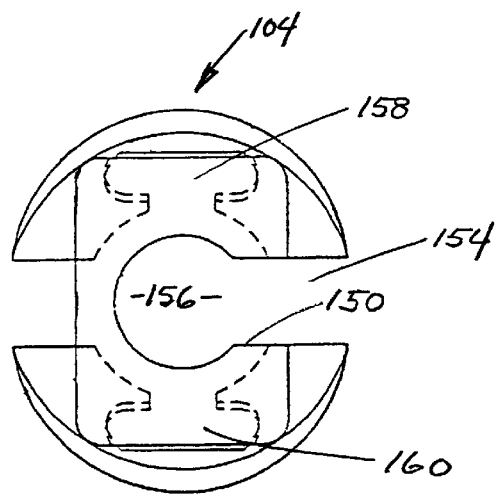
FIG. 5 is a front elevation view of the retainer of FIG. 4.
Figure 6:
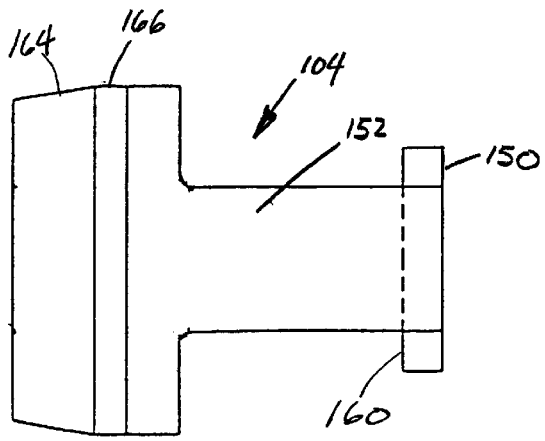
FIG. 6 is a top plan view of the retainer of FIG. 4.

As illustrated in FIGS. 4–6, the retainer 104 includes a "C" shaped base 150 and two legs 152 extending away from the base 150. Although not illustrated, the base 150 may also be an annular shaped solid ring. The base 150 is open on one of its sides to define a compressive space 154. A central aperture 156 is formed through base 150 and is continuous with compressive space 154. To install the retainer 104 onto the connector housing 102, the bolt 106 extends through the aperture 156 of the base 150 and into the connector housing 102. The diameter of the aperture 156 is slightly larger than the diameter of the bolt 106 to allow the retainer 104 to be slidably mounted on the bolt 106.

The legs 152 extend away from a top side 158 and a bottom side 160 of the base 150 and into the second bore 136 of the caliper 132. The legs 152 are rectangular in cross-section and have a width which is less than the width of sides 158 and 160. The legs 152 are radially spaced from the bolt 106.

Formed at the distal end of each leg is a clip 162 extending radially outward. Each clip 162 includes a semi-conical surface 164 which mates with the first conical surface 144 of the second bore 136 of the caliper 132; a semi-cylindrical surface 166 which mates with the first cylindrical surface 142 of the second bore 136 of the caliper 132; a radial shoulder 168 which bears the abutment surface 140 of the second bore 136 of the caliper 132. Each of these outer peripheral surfaces of the clip 162 is in mating contact with the adjacent interior surfaces of the second bore 136. The result is a snug, tight fit of the clips 162 within the second bore 136 of the caliper 132.

The bolt 106, as best seen in FIG. 3, for securing the retainer 104 to the connector housing 102, is a shoulder bolt. The bolt 106 includes a head 170 with a diameter greater than the diameter of the terminal end of the legs 152 of retainer 104 when the retainer is in the uncompressed state. This allows the head 170 to act as a stop, preventing the retainer 104 from sliding off the bolt 106 once the bolt 106 is inserted through the retainer 104. Axially inward of the head 170 is an unthreaded shoulder portion 172. The length of the shoulder 172 is slightly longer than the length of the retainer 104. The length of the retainer is defined to be the distance from the surface of the base 150, opposite of legs 152, to the terminal ends of the legs. The excess length of the shoulder portion 172, compared to the length of the retainer 104, allows the retainer 104 to have some play between the head 170 and the surface of the notch 130 of the connector housing. This prevents the retainer 104 from being pinched, and thus inoperable, once the bolt 106 and the retainer 104 is installed onto the connector housing 102. The diameter of the shoulder portion 172 is slightly smaller than the diameter of the aperture 156 of the base 150. This allows the retainer 104 to slide along the shoulder of the bolt 106.

Located at the distal end of the bolt is an externally threaded portion 174. The threading of the threaded portion 174 mates with the threading of the third bore 128 of the connector housing 102.

To install the bolt 106 and the retainer 104, the threaded portion 174 and the shoulder portion 172 are inserted through the retainer 104, first through the legs 152 of the retainer 104 in the direction of the base 150 of the retainer. After the terminal end of the legs 152 contact the head 170 of the bolt 106, the bolt 106 is threaded into the third bore 128 of the connector housing 102. The bolt 106 is threaded until the entire length of the threaded portion 174 is within the third bore 128 of the connector housing 102.

To establish the fluid path from the flexible hose to the caliper, the flexible hose is first installed onto the connector housing. The terminal end of the flexible hose is inserted into the groove 116 of crimp collar 110. After the flexible hose is inserted into the crimp collar 110, the outer surface of the crimp collar 110 is crimped or crushed radially inward, therefore collapsing the groove 116 and pinching the flexible hose between the collapsed groove. This crimping process retains the flexible hose in the crimp collar 110 and provides a seal preventing fluid leakage between the crimp collar and the flexible hose.

Once the flexible hose is installed onto the connector housing 102, the connector housing 102 is installed onto the caliper 132. The protrusion of the connector housing 118 is inserted into the first bore 134 of the caliper at the same time the retainer 104 is inserted into the second bore 136 of the caliper.

As the protrusion 118 is inserted into the first bore 134 of the caliper, the O-ring 126 is distorted between the channel 124 of the protrusion and the first bore 134 to form a seal between the connector housing 102 and the caliper 132.

As the retainer 104 is inserted into the second bore 136, the rim 138 of the second bore 136 causes the legs 152 of the retainer 104 to flex radially inward due to the abutment of the rim 138 against the semi-conical surface 164 of the retainer 104. The retainer 104 slides into the second bore 136 and the legs 152 flex radially inward until the abutment surface 168 of the retainer 104 surpasses the rim 138. Thereafter, the legs 152 spring radially outward such that each of the outer peripheral surfaces of the clips 162 is in mating contact with the adjacent interior surfaces of the second bore 136, resulting in a tight fit of the clips 162 within the second bore 136 of the caliper.

Once the retainer 104 is inserted into the second bore 136 of the caliper, the head 106 of the bolt is located within the second bore, thus preventing access to the head. However, situations can arise which would require the connector housing 102 to be removed from the caliper 136. To allow for removal of the connector housing, a slot 176 or other means is formed at the end of the bolt opposite the head 170. A typical flat head screwdriver, or other tools, can be inserted into the slot 176 of the bolt 106 to remove the bolt.

Figure 7:
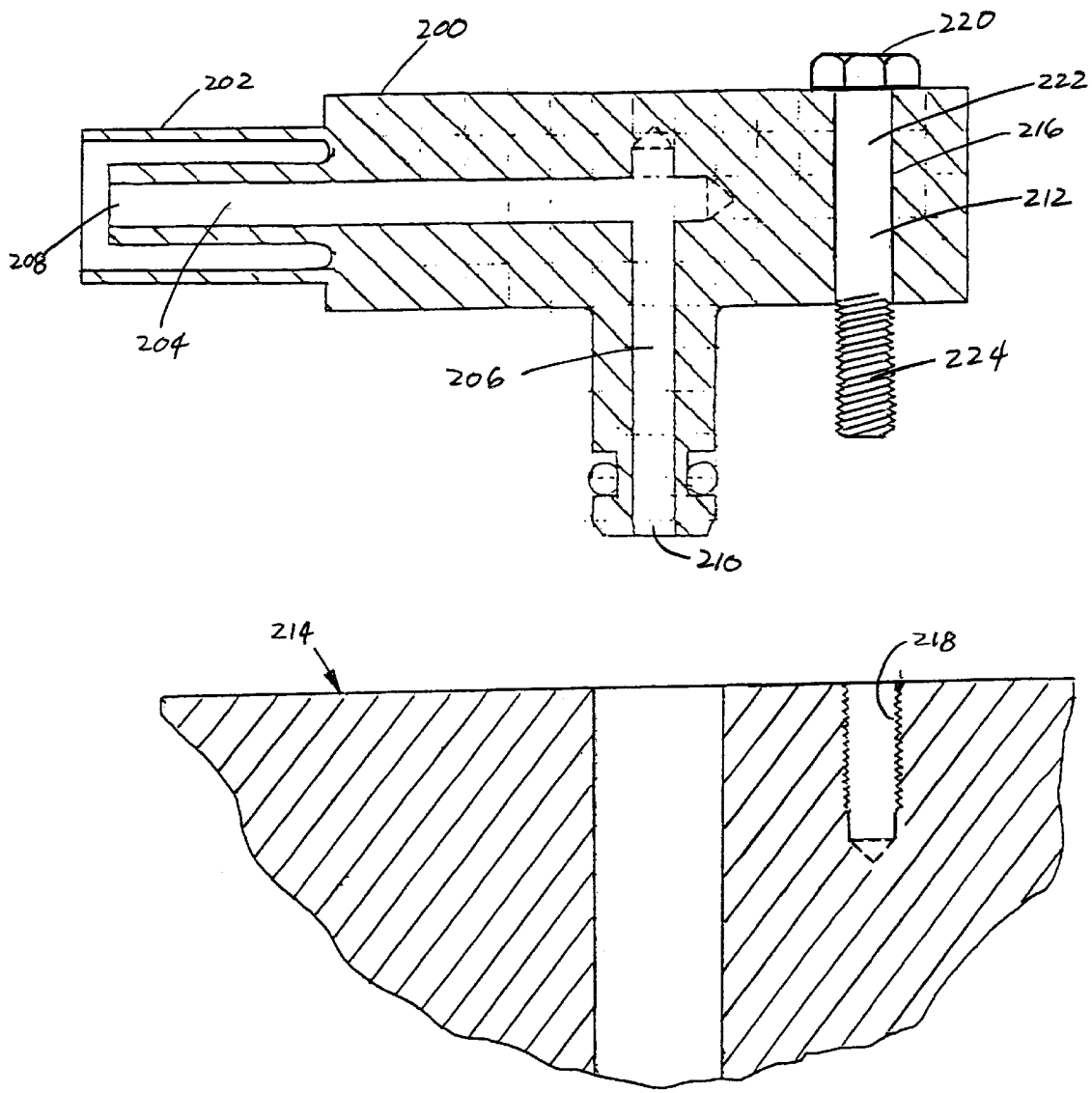
FIG. 7 is a sectional view of an alternative embodiment of a connector having a bolt for securing the connector to a fluid handling device.

An alternative embodiment using an alternative method for securing the connector housing to caliper is illustrated in FIG. 7. The fluid path of the alternative embodiment is the same as the fluid path of the first embodiment. A connector housing 200 comprises a crimp collar 202 for connecting the connector housing 200 to a flexible hose. The alternative embodiment has a first bore 204 defined in the connector housing 200 and a second bore 206 defined in the connector housing 200. The first bore 204 intersects the second bore 206 to form a fluid path from the entrance 208 of the first bore 204 to the entrance 210 of the second bore 206.

Rather than using a quick connect retainer to secure the connector housing to the caliper, as in the first embodiment, the alternative embodiment uses a bolt 212 to secure the connector housing 200 to the caliper 214.

In place of a threaded third bore of the connector housing 200 is a smooth third bore 216. The second bore of the caliper as disclosed in the first embodiment is replaced with a threaded second bore 218 of the caliper.

The bolt 212 of the alternative embodiment has a head 220, a non-threaded shoulder portion 222 and a threaded portion 224. The length of shoulder portion 222 is slightly shorter than the thickness of the connector housing 200, and the diameter of the shoulder portion 222 is slightly smaller than the diameter of the third bore 216. The threading of the threaded portion 224 mates with the threading of the second bore 218 of the caliper.

Figure 8:
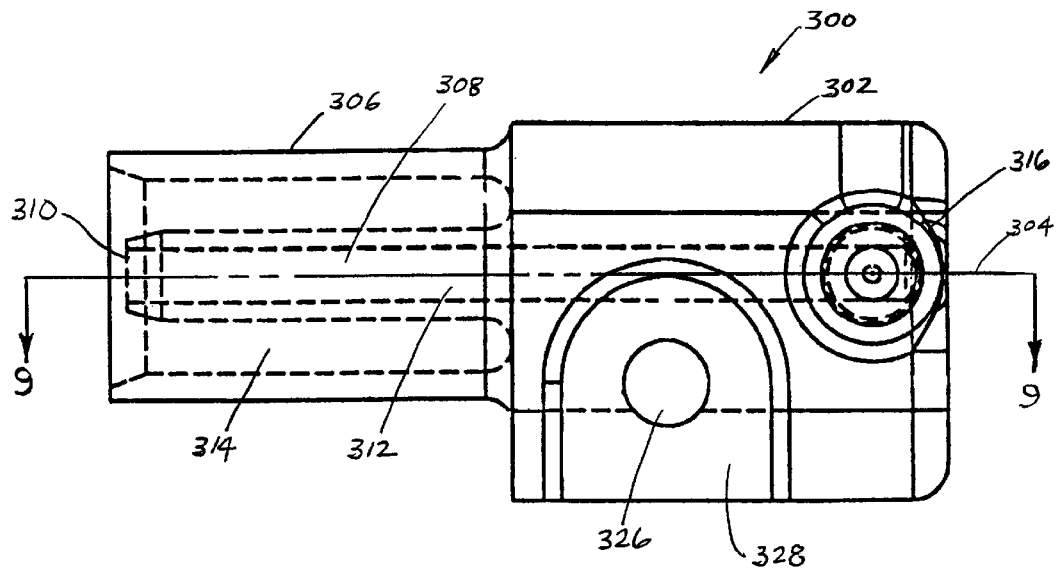
FIG. 8 is a bottom plan view of a third embodiment of a connector housing.
Figure 9:
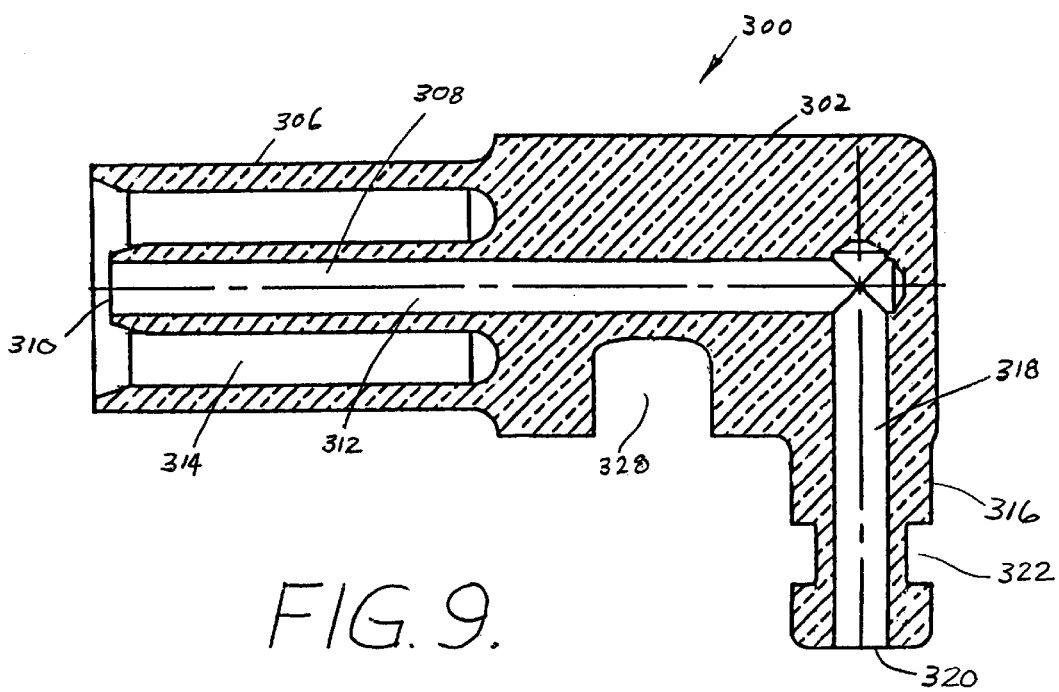
FIG. 9 is a sectional view of the connector housing of FIG. 8 as taken along line 9—9.

FIGS. 8 and 9 illustrate a connector housing of a third embodiment of a connector of the present invention. The third embodiment is essentially the same as the first embodiment with the exception of the third bore, for securing the retainer to the connector housing, located longitudinally between the entrance of the first bore, defining one end of the fluid path, and the entrance of the second bore, defining the other end of the fluid path.

The connector housing is secured to a caliper (not shown) having a first bore defining a fluid path and a second bore for securing the connector to the caliper.

The connector housing 300 has a generally rectangular shaped body 302. The connector housing 300 defines a longitudinal axis 304 extending along the length of connector housing 300. Formed at one end of the rectangular shape body 302 and in-line with the longitudinal axis 304 of the connector housing is a cylindrical crimp collar 306. Located at the center of the crimp collar 306 is an entrance 310 to a first bore 308 extending axially inwardly into the connector housing 300 and in-line with the longitudinal axis 304. The entrance to the first bore 308 defines one end of a fluid path 312 extending through the connector housing 300. Radially outwardly and axially inwardly of the entrance 310 is an annular groove 314. The diameter of the annular groove 314 is approximately the same diameter of the flexible hose (not shown) to which the connector housing 300 is to be connected. Likewise, the thickness of the annular groove 314 is slightly larger than the thickness of the hose to which the connector housing 300 is to be connected.

A protrusion 316 is formed on the underside of the connector housing 300 and located along the longitudinal axis 304 of the connector housing 300. The protrusion 316 is perpendicular to the first bore 308. The distal end of the protrusion 316 defines an entrance 320 to a second bore 318 extending perpendicular to the first bore 308. The second bore 318 extends into the connector housing 300 until it intersects the first bore 308, thus creating a fluid path extending from the entrance 310 of the first bore 308 to the entrance 320 of the second bore 318. Therefore, the first bore 308 and the second bore 318 need only extend far enough into the connector housing 300 to intersect each other for forming the fluid path 312.

A channel 322 is defined on the outer surface of the protrusion 316. To provide adequate sealing between the protrusion and the first bore of the caliper, in which the protrusion 316 is to be inserted, an O-ring (not shown) is situated in the channel. Upon the protrusion 316 being inserted into the first bore of the caliper, the O-ring is distorted between the channel 322 of the protrusion 316 and the first bore of caliper to form a seal between the connector housing 300 and the caliper.

A threaded third bore 326, parallel with the second bore 318, is defined in the connector housing 300 longitudinally between the entrance 310 of the first bore 308 and the entrance 320 of the second bore 318. The third bore 326 is offset at a given distance from the longitude axis 304. Since the third bore 326 is offset at a given distance from the longitudinal axis 304, and likewise the first bore 308 and second bore 318, neither the first bore 308 nor the second bore 318 intersects the third bore 326. A notch 328 is defined at the underside of the connector housing 300 in-line with the third bore 326.

A retainer (not shown), identical to the retainer 104 disclosed in the first embodiment, is situated in the notch 328 defined at the underside of the connector housing 300. A bolt (not shown), identical to the bolt 106 disclosed in the first embodiment, is inserted through the retainer and secured in the third bore 326. As with first embodiment, the retainer of the third embodiment is inserted into the second bore of the caliper to secure the connector housing 300 to the caliper. The second bore of caliper is sized to receive and retain the retainer upon the retainer being fully inserted into the second bore of the caliper.

Rather than using a quick connect retainer to secure the connector housing to caliper, the connector housing 300 of the third embodiment can also be secured to the caliper through the use of a bolt inserted through the third bore 326 of the connector housing 300 and threaded to a second threaded bore of the caliper. The bolt for securing the connector housing to the caliper is identical to and functions in the same manner as the bolt 212 of the second embodiment.

The first, second and third embodiments disclose two intersecting bores extending into the connector housing for forming a fluid path from the flexible hose to the caliper. It should be noted that the two intersecting bores can be replaced by a single bore extending through the connector housing for forming the fluid path from the flexible hose to the caliper. In such an embodiment, the single bore would have one entrance at the center of the crimp collar communicating with the flexible hose and another entrance at the distal end of the protrusion communicating with the first bore of the caliper. Since the first and second bores are replaced with a single bore, there are only two bores defined in the connector housing. Therefore, the third bore of the connector housing would be renamed as the second bore of the connector housing.

Figure 10:
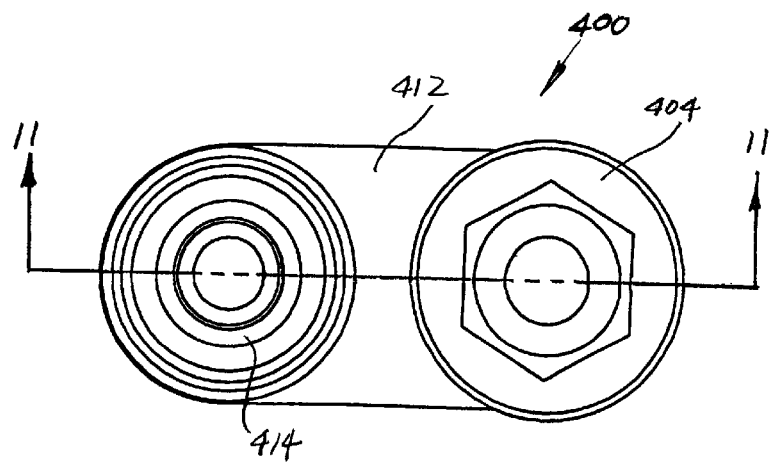
FIG. 10 is a top plan view of fourth embodiment of a connector.
Figure 11:
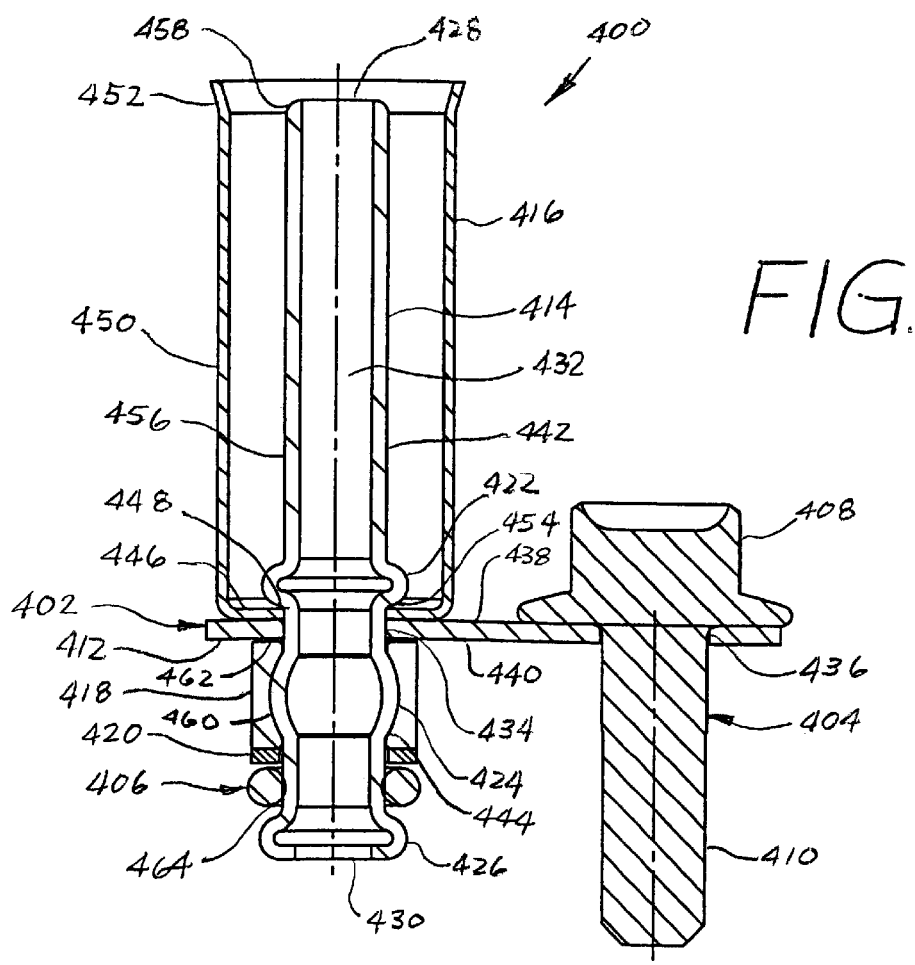
FIG. 11 is a sectional view of the connector of FIG. 10 as taken along line 11—11.

FIGS. 10 and 11 illustrate a fourth embodiment of a connector of the present invention. The connector 400 in accordance to the fourth embodiment comprises a connector housing 402, a bolt 404 and an O-ring 406. The bolt 404 has a head portion 408 and a threaded portion 410.

The connector housing is secured to a caliper (not shown) having a first bore defining a fluid path and a second bore for securing the connector to the caliper.

The connector housing 402 includes a retaining plate 412, a metal tubing 414, a cylindrical crimp collar 416, a sleeve 418 and a backup ring 420. The metal tubing 414 has an approximately constant pre-formed diameter with three enlarged diameter upsets 422, 424 and 426 formed thereon. The metal tubing 414 has a first opening 428, a second opening 430 and a bore 432 extending through the tubing 414. The retaining plate 412 defines a first aperture 434 at one end of the retaining plate and a second aperture or bore 436 at the other end of the retaining plate. The diameter of the first aperture 434 is slightly larger than the pre-formed diameter of the tubing 414. This allows the tubing 414 to be inserted into the first aperture 434 of the retainer plate 412 prior to forming the upsets 422, 424 and 426. The diameter of the second aperture or bore 436 is slightly larger than the diameter of the threaded portion 410 of the bolt 404 and smaller than the head portion 408 of the bolt 404. This allows the threaded portion 410 to be inserted through the second aperture or bore 436 and the head portion 408 to act as a limit surface.

The retaining plate 412 has a first surface 438 and a second surface 440. A first portion 442 of the tubing 414 extends longitudinally outwardly from the first surface 438 of the retaining plate 412. A second portion 444 of the tubing 414 extends longitudinally outwardly from the second surface 440 of the retaining plate 412.

Upon inserting the threaded portion 410 of the bolt 404 through the second aperture or bore 436, the head portion 408 is located longitudinally outwardly of the first surface 438 of the retaining plate 402 and the majority of the threaded portion 410 is located longitudinally outwardly of the second surface 440 of the retaining plate 412. The threaded portion 410 of the bolt 404 is sized to be threaded into a mating threaded bore of the caliper (not shown) to retain the connector housing 402 to the caliper.

The cylindrical crimp collar 416 is located radially outwardly of the first portion 442 of the tubing 414. The cylindrical crimp collar 416 includes an annular ring 446 having an aperture 448 defined at the center of the annular ring 446. The diameter of the aperture 448 of the annular ring 446 is approximately equal to the diameter of the first aperture 434 of the retaining plate 412 and slightly larger than the pre-formed diameter of the tubing 414. The radially outwardly surface of the annular ring 446 extends longitudinally outwardly to form the cylindrical portion 450 of the cylindrical crimp collar 416. The cylindrical portion 450 terminates at a chamfered portion 452 extending radially outwardly. The chamfered portion 452 allows for easy insertion of a hose into the crimp collar 416.

Radially inwardly of the crimp collar 416 is the first portion 442 of the tubing 414. The annular ring 446 surrounds the tubing 414 immediately longitudinally outwardly from the first surface 438 of the retaining plate 412. Longitudinally outwardly of the portion of the tubing 414 surrounded by the annular ring 446 is the first enlarged diameter upset 422. The outer diameter of the first upset 422 is significantly larger than the diameter of the aperture 448 of the annular ring 446. The longitudinally inner surface 454 of the first upset acts as a limit surface preventing the tubing 414 from moving longitudinally inwardly toward the retaining plate 412.

Longitudinally outwardly of the first upset is a pre-formed diameter section 456 of the first portion 442 of the tubing 414 terminating at chamfered portion 458. The chamfered portion 458 of the tubing 414 allows for easy installation of a hose surrounding the pre-formed diameter portion 456 of the tubing 414.

The sleeve 418 surrounds a portion of the tubing 414 immediately longitudinally outwardly from the second surface 440 of the retaining plate 412. Located longitudinally mid-way in the inner surface of the sleeve 418 is an annular notch 460. Radially inwardly of the notch 460 is the second enlarged diameter upset 424 formed on the tubing 414. The second upset 424 prevents the sleeve 448 from moving radially and longitudinally. The longitudinally inner surface 462 of the sleeve 418 acts as a limit surface preventing the tubing 414 from moving longitudinally inwardly toward the retaining plate 412.

Longitudinally outwardly of the second upset 424 is a pre-formed diameter section 464 of the second portion 444 of the tubing 414 terminating at the enlarged diameter terminal end 426. Surrounding the pre-formed diameter section 464 of the second portion 444 of the tubing 414 and immediately longitudinally outwardly of sleeve 418 is the backup ring 420. The backup ring 420 provides a smooth surface for the O-ring 406 to abut.

Surrounding the pre-formed diameter section 464 of the second portion 444 of the tubing 414 and longitudinally between the backup ring 420 and the enlarged diameter terminal end 426 is the O-ring 406. The O-ring 406 is sized such that the O-ring 406 is distorted upon inserting the second portion 444 of the tubing 414 into the mating bore of the caliper to which the connector housing 402 is connected to form a seal between the connector housing 402 and the mating bore.

Various features of the present invention have been described with reference to the preferred embodiments. It should be understood that modifications may be made to the connector for connecting a hose to a fluid path within a bore without departing from the spirit and scope of the present invention as represented by the following claims.

What is claimed is:

1. A connector, for connecting a hose to a fluid handling device having a first bore defining a fluid path and a second bore, comprising:
   a connector housing having a first bore, a second bore and a third bore; said first bore of said connector housing having an entrance and a terminal end, said second bore of said connector housing having an entrance and a terminal end, said third bore of said connector housing having an entrance, said terminal end of said first bore intersecting said terminal end of said second bore, said entrance of said first bore communicating with said hose, said entrance of said second bore of said connector housing communicating with said fluid path within said first bore of said fluid handling system, said entrance of said third bore of said connector housing located longitudinally between said entrance of said first bore and said entrance of said second bore; and
   a retaining mechanism for retaining said connector housing to said fluid handling device, said retaining mechanism having a first end and a second end, wherein said retaining mechanism being retained to said third bore of said connector housing at said first end of said retaining mechanism and to said second bore of said fluid handling device at said second end of said retaining mechanism.

2. The connector as claimed in claim 1 wherein said third bore is parallel to said second bore.

3. The connector as claimed in claim 1 wherein said first bore of said connector housing does not intersect said third bore said connector housing.

4. The connector as claimed in claim 1 wherein said second bore of said connector housing does not intersect said third bore said connector housing.

5. The connector as claimed in claim 1 wherein said first bore of said connector housing is approximately ninety degrees from said second bore of said connector housing.

6. The connector as claimed in claim 1 wherein said first bore of said connector housing defines a longitudinal axis along said connector housing, said third bore of said connector housing is offset to one side of said longitudinal axis.

7. The connector as claimed in claim 1 wherein said retainer mechanism comprises a bolt and a retainer, said bolt being inserted through said retainer and secured to said third bore of said connector housing, said retainer being retained to said second bore of said fluid handling device.

8. The connector as claimed in claim 7 wherein said retainer includes a base and a plurality of legs extending from said base, each of said leg having a clip extending radially outwardly for retaining said retainer to said second bore of said fluid handling device.

9. The connector as claimed in claim 1 wherein said retaining mechanism comprises a bolt, said bolt being inserted through said third bore of said connector housing and secured to said second bore of said fluid handling device.

10. The connector as claimed in claim 1 wherein said connector housing further having a protrusion extending from said connector housing, said protrusion having a terminal end defining said entrance of said bore of said connector housing.

11. The connector as claimed in claim 10 further comprising an O-ring surrounding said protrusion, said O-ring in sealing interaction with said protrusion and said first bore of said fluid handling device.

12. The connector as claimed in claim 1 wherein said connector housing further comprises a crimp collar radially outwardly of said entrance of said first bore of said connector housing.

13. A connector, for connecting a hose to a fluid handling device having a first bore defining a fluid path and a second bore, comprising:
   a connector housing having a first bore and second bore, said first bore of said connector housing defining a first and second entrance, said first entrance of said first bore of said connector housing communicating with said hose, said second entrance of said first bore of said connector housing communicating with said fluid path within said first bore of said fluid handling system;
   said connector housing further having a sleeve surrounding a protrusion extending from said connector housing, said protrusion having an enlarged diameter upset formed thereon for retaining said sleeve on said protrusion, said protrusion having a terminal end defining said second entrance of said first bore of said connector housing; and
   a retaining mechanism for retaining said connector housing to said fluid handling device, said retaining mechanism having a first end and a second end, wherein said retaining mechanism being retained to said second bore of said connector housing at said first end of said retaining mechanism and to said second bore of said fluid handling device at said second end of said retaining mechanism.

14. The connector as claimed in claim 13 wherein said upset is formed at given distance from said terminal end of said protrusion.

15. The connector as claimed in claim 13 further having a notch formed in said sleeve, said notch receiving said upset to retain said sleeve on said protrusion.

16. The connector as claimed in claim 13 wherein said first bore of said connector housing does not intersect said second bore said connector housing.

17. The connector as claimed in claim 13 wherein said retaining mechanism comprises a bolt, said bolt being inserted through said second bore of said connector housing and secured to said second bore of said fluid handling device.

18. The connector as claimed in claim 13 wherein said connector housing further having a protrusion extending from said connector housing, said protrusion having a terminal end defining said entrance of said bore of said connector housing.

19. The connector as claimed in claim 13 further comprising an O-ring surrounding said protrusion, said O-ring in sealing interaction with said protrusion and said first bore of said fluid handling device.

20. The connector as claimed in claim 13 wherein said connector housing further comprises a crimp collar radially outwardly of said entrance of said first bore of said connector housing.

21. A connector, for connecting a hose to a fluid handling device having a first bore defining a fluid path and a second bore, comprising:

a connector housing having a first bore, a second bore and a third bore; said first bore of said connector housing having an entrance and a terminal end, said second bore of said connector housing having an entrance and a terminal end, said third bore of said connector housing having an entrance, said terminal end of said first bore intersecting said terminal end of said second bore, said entrance of said first bore communicating with said hose, said entrance of said second bore of said connector housing communicating with said fluid path within said first bore of said fluid handling system; and a retaining mechanism for retaining said connector housing to said fluid handling device, said retaining mechanism having a first end and a second end, wherein said retaining mechanism being retained to said third bore of said connector housing at said first end of said retaining mechanism and to said second bore of said fluid handling device at said second end of said retaining mechanism, said retainer mechanism comprises a bolt and a retainer, said bolt being inserted through said retainer and secured to said third bore of said connector housing, said retainer being retained to said second bore of said fluid handling device, said bolt having an enlarged diameter head formed at one end of said bolt to prevent said retainer from sliding off said bolt and a slot defined at the other end of said bolt to allow said bolt to be removed from said connector housing.

22. The connector as claimed in claim 21 wherein said third bore is parallel to said second bore.

23. The connector as claimed in claim 21 wherein said first bore of said connector housing does not intersect said third bore said connector housing.

24. The connector as claimed in claim 21 wherein said second bore of said connector housing does not intersect said third bore said connector housing.

25. The connector as claimed in claim 21 wherein said first bore of said connector housing is approximately ninety degrees from said second bore of said connector housing.

26. The connector as claimed in claim 21 wherein said retainer includes a base and a plurality of legs extending from said base, each of said leg having a clip extending radially outwardly for retaining said retainer to said second bore of said fluid handling device.

27. The connector as claimed in claim 21 wherein said connector housing further having a protrusion extending from said connector housing, said protrusion having a terminal end defining said entrance of said bore of said connector housing.

28. The connector as claimed in claim 27 further comprising an O-ring surrounding said protrusion, said O-ring in sealing interaction with said protrusion and said first bore of said fluid handling device.

29. The connector as claimed in claim 21 wherein said connector housing further comprises a crimp collar radially outwardly of said entrance of said first bore of said connector housing.

* * * * *